April 20, 1971 J. C. STERNBERG 3,575,836
POLAROGRAPHIC SENSOR
Filed Feb. 14, 1969

INVENTOR.
JAMES C. STERNBERG
BY *Thomas L. Peterson*
ATTORNEY

United States Patent Office 3,575,836
Patented Apr. 20, 1971

3,575,836
POLAROGRAPHIC SENSOR
James C. Sternberg, Fullerton, Calif., assignor to
Beckman Instruments, Inc.
Filed Feb. 14, 1969, Ser. No. 799,335
Int. Cl. G01n 27/46
U.S. Cl. 204—195
13 Claims

ABSTRACT OF THE DISCLOSURE

A polarographic sensor comprising a pair of electrodes joined by an electrolyte with inner and outer membranes separating the electrode and electrolyte from the sample medium. The outer membrane is permeable to the gas being determined and impermeable to electrolyte while the inner membrane has an opening therein which overlies the sensing electrode of the sensor. This inner membrane is substantially less permeable to the gas being analyzed than the outer membrane and is hydrophilic so as to retain a film of electrolyte between the outer membrane and the electrodes. Preferably the outer membrane is formed of polytetrafluoroethylene and the inner membrane of polyethylene terephthalate (Mylar).

BACKGROUND OF THE INVENTION

Field of the invention

This invention relates generally to a polarographic sensor for measuring a gaseous constituent in a sample medium and, more particularly, to the membrane materials employed in the sensor for separating the electrodes and electrolyte therein from the sample medium.

Description of prior art

Polarographic sensors of the type to which this invention pertains generally comprise a pair of electrodes joined by an electrolyte and separated from the sample medium to be analyzed by means of a membrane that is permeable to a gaseous constituent in the sample, but is impermeable to the electrolyte. Such a sensor is described in U.S. Pat. No. 2,913,386. In this type of sensor, normally a suitable voltage is impressed across electrodes and, in the absence of the gaseous constituent in the sample that is to be analyzed, the electrode system becomes polarized so that the current which normally flows through the electrolyte is reduced, to nearly zero, after a short time. In the presence of the constituent in the sample that is to be analyzed, the electrode system becomes depolarized and current flows again. The magnitude of the current in these devices is a function of the rate or speed with which the constituent to be analyzed can pass through the membrane and of the diffusion processes that take place in the immediate vicinity of the system, particularly the membrane. As the constituent to be analyzed has to pass through the membrane and the electrolyte film disposed between the membrane and the sensing electrode of the cell, the permeability characteristics of the membrane and spatial relationship between the membrane and the electrode are extremely important. It has been found that some membranes such as polytetrafluoroethylene (e.g. Teflon) and to a lesser degree such materials as polyethylene, polyproylene and silicone rubber, are quite suitable for these cells. Teflon, especially, allows relatively rapid passage of some constituents that are commonly analyzed, the most important of which is oxygen, yet is relatively impermeable to electrolyte.

Although the sensors of the above-mentioned type have given accurate performance for many practical situations, it has been found that occasionally a shift in calibration of the reading of the sensors has appeared, the sensors are subject to pressure fluctuations in the sample medium, and the long-term stability and operative life of the sensors are somewhat limited. After careful analysis, it has been determined that the shift in calibration readings and instability in the electrical output of the sensors is due to changes in the spatial relationship between the Teflon or like oxygen permeable membrane and the electrode surface against which it is placed. An attempt has been made to overcome these problems by tightly squeezing the membrane toward the sensing electrode surface. However, two types of difficulties have been encountered when this has been done. In the first place, it is possible that by tightly squeezing the membrane against the electrode surface, the electrolyte film that is disposed between the membrane and the sensing electrode becomes completely squeezed out which will render the sensor inoperable. Secondly, it has been observed that when a membrane of the type described above is placed under high tension, a considerable amount of cold flow takes place which, changes, after a few days, the tension which was originally applied. As a consequence, the spatial relationship between the membrane and sensing electrode changes and, as a result, the response of these sensors does not remain completely constant.

In addition, while Teflon or the other commonly utilized membranes discussed above are relatively impervious to electrolyte, they are somewhat permeable to water vapor. As a consequence, when the sensors are exposed to air or other gaseous medium over an extended period of time, water vapor from the electrolyte will diffuse out of the sensor through the membrane. In addition, because of the hydrophobic nature of the membrane, water tends to escape as vapor from the imperfectly sealed back end of the sensor, under the sealing O-ring and out between folds in the membrane. Hence, electrolyte in sensors of this type which are not provided with large electrolyte reservoirs will tend to evaporate and the performance of the sensors will deteriorate until they are no longer suitable for accurate measurements.

In order to overcome this problem of the electrolyte evaporating and the problem discussed above concerning the spatial relationship between the membrane and the sensing electrode, in the past certain hydrophilic membrane materials or spacers as they have been called have been disposed between the Teflon or other similar membrane and the sensing electrode. Examples of such hydrophilic membrane material are lens paper, a filter material sold under the trade name. Millipore, and cellophane. These hydrophilic membranes have the advantages that they retain electrolyte, and therefore extend the life of the sensor, and to a limited degree withstand changes in the spatial relationship between the outer membrane and the sensing electrode. Thus the outer membrane need not be drawn under tension as great as when the hydrophilic spacer material is not present. As a result, the outer membrane will not be affected by the cold flow problem discussed previously if the membrane were tightly drawn over the end of the sensing electrode.

However, the preciously utilized hydrophilic spacer materials have several disadvantages. One is that they are relatively spongy, i.e., are compressible in the direction normal to their planar surface. As a consequence, if there are variations of appreciable magnitude in the pressure of the sample medium, such variations will result in compression of the inner membrane and hence a change in the spatial relationship between the outer Teflon membrane and the sensing electrode. Thus, the previous spacer materials have not been successful in substantially eliminating instability in the output of polarographic sensors. Moreover, while these previous hydrophilic membrane materials retain electrolyte, they are extremely permeable to electrolyte throughout their entire thickness. Thus, while they serve to increase the life of the cells, they still do not prevent water vapor from the electrolyte from diffusing outwardly into a gaseous medium through the outer Teflon or like membrane.

In addition, the previously utilized hydrophilic membrane materials are highly permeable to gases, for example oxygen. As a consequence, oxygen diffusing through the outer membrane will dissolve in the electrolyte absorbed in the hydrophilic inner membrane. This will result in the sensing electrode being subject not only to diffusion processes occurring immediately adjacent thereto which are directly attributable to oxygen in the sample medium, but also to the diffusion of oxygen thereto which is dissolved in the electrolyte in the inner membrane. This second diffusion process adversely affects the speed of response of the sensor to changing concentrations of the oxygen in the sample medium.

Lastly, the previously utilized hydrophilic spacer materials, namely lens paper, cellophane, etc., when wetted by electrolyte are extremely fragile and readily tear when pulled under tension over the end of the sensing electrode. From the foregoing, it can be seen that there is a need for an improved membrane arrangement for polarographic sensors so that the above-mentioned problems may be overcome or minimized.

SUMMARY OF THE INVENTION

It is the principal object of the present invention to provide an improved polarographic sensor having relatively high stability and long life.

According to the principal aspect of the present invention, there is provided in a polarographic sensor of the general type described hereinabove an inner membrane between the outer Teflon or like membrane and the sensing electrode which is formed with an opening therein overlying the sensing electrode and has gas and electrolyte permeability characteristics approximating that of polyethylene terephthalate (i.e., Mylar). As will be seen later, such a membrane material has characteristics which will enhance the life of a polarographic sensor and the stability of its output signal.

Other objects, aspects and advantages of the invention will become apparent from the following description taken in connection with the accompanying drawing.

DESCRIPTION OF THE PREFERRED EMBODIMENT

Figure 1:
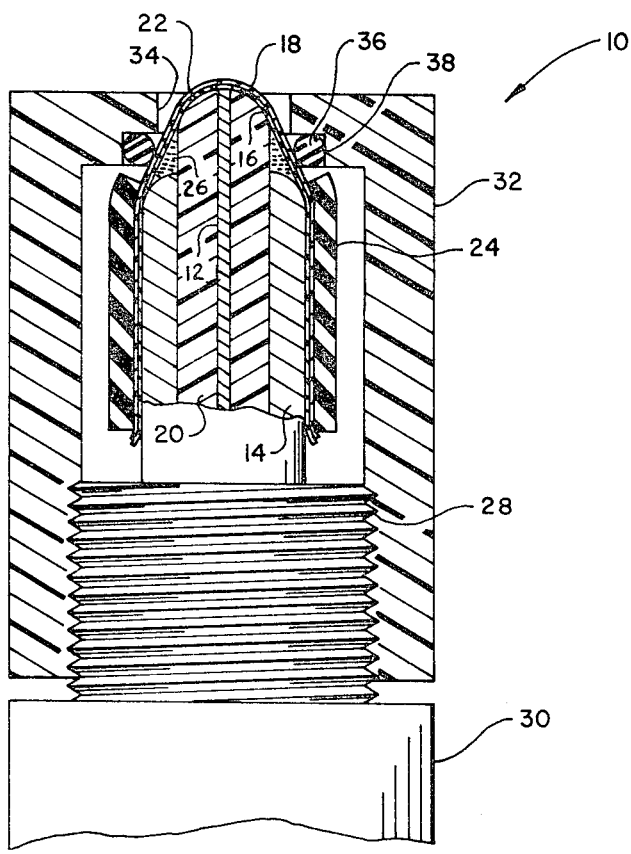
FIG. 1 is a longitudinal partial sectional view of the sensing end of a polarographic sensor constructed in accordance with the present invention.

Referring now to the drawing in detail, the polarographic sensor of the present invention, generally designated 10, comprises a sensing electrode 12 and a second electrode 14 which are separated from the sample medium by means of a pair of contiguous membranes 16 and 18. The sensing electrode 12 is in the form of a wire which is embedded in a plastic or glass body 20.

The end of the electrode is flush with the hemispherical end 22 of the body. The second electrode 14 is of annular configuration and surrounds the body 20. This second electrode terminates behind the end 22 of the body. The membranes 16 and 18 are tightly drawn over the end 22 of body 20 and over the second electrode 14 by means of an elongated elastomeric band 24, preferably formed of a segment of silicone rubber tubing. This band provides a large area of sealing contact between the membranes and the electrode 14 in contrast to O-rings which are conventionally utilized and provide only a line sealing contact. Since the forward end of the electrode 14 is disposed behind the end 22 of the body 20, it is seen that a small electrolyte reservoir 26 is provided behind the membranes and between electrodes 12 and 14.

The electrodes 12 and 14, and the body 20 extend forwardly from the threaded end 28 of the main sensor body 30. A plastic cap 32 is threaded to the end 28 of the sensor. This cap is formed with a central opening 34 in its forward end through which extends the membrane covered sensing electrode 12. A rubber O-ring 36 disposed in an annular recess 38 in the cap engages the outer membrane 18 when the cap is threaded onto the end 28 of body 30 and serves to tightly pull the membranes 16 and 18 over the end 22 and the exposed end of sensing electrode 12 in the body 20.

The outer membrane 18 is preferably formed of polytetrafluoroethylene (Teflon) or other highly gas permeable membranes, as for example polyethylene, polypropylene and silicone rubber. The inner membrane 16 is formed of a hydrophilic plastic material which retains an electrolyte film between the outer membrane 18 and the end 22 of body 20. The membrane 16 will be described in greater detail later.

When the cell 10 is used for the polarographic measurement of oxygen, the sensing electrode 12 may be formed of gold, rhodium, or other noble metal, the second electrode 14 may be formed of silver and the electrolyte 26 is then suitably a potassium chloride solution. As well known in the art, a suitable polarizing potential is impressed across the electrodes from an external circuit, not shown, so that when oxygen diffuses through the membrane 18 into the electrolyte film space adjacent to the electrode 12, the oxygen is reduced at the electrode, thereby producing a current which is an indication of the partial pressure of oxygen in the sample medium being analyzed. Also, as is well known in the art, the external voltage source may be eliminated if the electrodes are formed of materials which produce an electrical voltage potential therebetween of proper magnitude. For example, the electrode 12 may be formed of gold, silver or other noble metal and the electrode 14 of zinc, cadmium or lead and the electrolyte may be potassium hydroxide solution.

Figure 2:
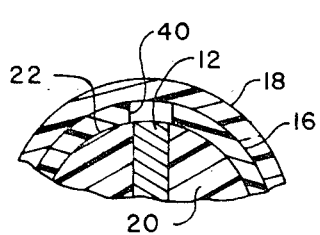
FIG. 2 is an enlarged fragmentary view, in longitudinal section, of the end of the sensing electrode embodying one form of the membrane arrangement of the invention.

In accordance with the present invention, the inner membrane 16 is formed of a hydrophilic—that is, liquid permeable—membrane which is substantially less permeable to oxygen or other gases being analyzed than the outer membrane 18, and is formed with a central opening 40 which is aligned with the sensing electrode 12. As best seen in FIG. 2, in one embodiment of the invention the opening 40 is about the same size as, or substantially larger than the diameter of the electrode 12 so that the entire exposed surface of the electrode is available for reaction with oxygen diffusing through the membrane 18 into the cell. The preferred material for the membrane 16 is polyethylene terephthalate (Mylar) which is about 1000 times less permeable to oxygen than the outer Teflon membrane. While Mylar is the preferred material for the inner membrane 16, other membranes such as Saran (polyvinylidene chloride) which are hydrophilic and relatively impermeable to oxygen could also be utilized to advantage. It is to be understood, therefore, that while Mylar will be referred to hereinafter in the specification as the material for membrane 16, the invention is not limited to the use of Mylar only.

It has been discovered that Mylar has various characteristics which makes it particularly advantageous for the use as the inner membrane 16 in the sensor of the present invention. The low oxygen permeability characteristic of Mylar is of advantage in the present invention in that it effectively eliminates the region between the electrodes 12 and 14 in contact with the sample through the outer gas permeable membrane 18. As a consequence, by the use of the relatively gas impermeable Mylar, there is a substantial reduction of the absorption of oxygen into the electrolyte in the sensor and hence in the diffusion of oxygen from the electrolyte to the sensing electrode 12. Therefore, the sensing electrode behind the opening 40 in the Mylar membrane is effectively exposed only to oxygen in the sample diffusing directly thereto through the outer membrane 18 into the cell. As a consequence, by the invention there is provided a well-defined diffusion area adjacent to electrode 12 and hence the rate diffusion process in the polarographic sensor is essentially a function only of the oxygen in the sample. Thus, the sensor of the present invention has a short response time to changes in the oxygen content of the sample being analyzed.

Mylar has the further advantage that it is a tough, durable plastic of high tensile strength, even when wetted. Thus, the Mylar membrane 16 may be pulled tightly over the sensing end of the sensor 10 without tearing as do previous electrolyte spacer materials utilized between the gas permeable membrane and electrodes of prior art sensors.

In addition, Mylar has the advantage that it is substantially incompressible in the direction normal to its planar surface as compared to cellophane, lens paper or other filter papers utilized previously as spacers in polarographic sensors. Hence, the Mylar membrane 18 provides a well-defined electrolyte film space between the outer membrane 18 and the sensing electrode 12. As a result, the spatial relationship between the membrane 18 and sensing electrode remains relatively constant even when there are pressure fluctuations of appreciable magnitude in the sample being analyzed. In fact, as compared to a commercially available oxygen sensor of essentially the same construction as that illustrated in FIG. 1 employing only a single membrane of Teflon, it has been found that in the analysis of a stirred liquid sample the sensor of the present invention produces approximately five times less noise in a derivative output signal. Thus, the current output of the cell of the present invention has unexpectedly high stability.

Mylar has the further advantage that it is essentially water impermeable yet is hydrophilic on its surface. Since it is relatively water impermeable except for the hydrophilic nature of its surface, electrolyte will not escape in the form of water vapor out through the membrane 18 to a surrounding gaseous environment. Yet, the hydrophilic surface of Mylar retains electrolyte thus ensuring electrolytic connection between the two electrodes 12 and 14 for substantial periods of time. These two characteristics of Mylar thus lead to greatly increased life of the sensor. In fact, a sensor as illustrated in FIG. 1 has exhibited continuing satisfactory performance for approximately three weeks when employed under normal conditions in a circulating air bath at 34° C. in an analytical instrument in which liquid samples were being analyzed. A conventional sensor of the same construction as the present invention without the Mylar membrane has been found to exhibit satisfactory performance over a period of only two days under the same conditions. Moreover, it has further been found that even when a sensor as shown in FIG. 1 has been exposed to ambient air for a period of five months, it still performs satisfactorily. This is in comparison to a conventional polarographic sensor which will not perform satisfactorily after being exposed to ambient air for about one week.

Figure 3:
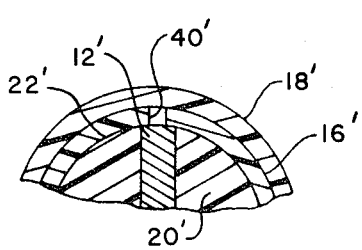
FIG. 3 is a view similar to FIG. 2 but showing a different form of the membrane arrangement of the invention.

Reference is now made to FIG. 3 wherein there is shown the second embodiment of the invention. In this embodiment the basic structure is as previously described and like numbers primed are used to indicate like or corresponding parts. In this embodiment, the opening 40' in the Mylar membrane 16' is smaller than the exposed area of the electrode 12'. As a consequence, the area of the membrane 16' adjacent to the opening 40' covers or masks a portion of the exposed end of electrode 12'. Thus the effective area of the electrode may be altered by merely providing membranes 16' incorporating openings 40' of different diameters. The reduction in the exposed area of the sensing electrode 12' serves to minimize the depletion of oxygen in a small sample adjacent to the sensing end of the sensor and thus minimizes errors in the output signal of the sensor. The depletion of oxygen in the sample as just mentioned is normally referred to in the art as the "stirring effect" of a polarographic sensor.

Although I have herein shown and described my invention in what I have conceived to be the most practical preferred embodiments, it is recognized that departures may be made therefrom within the scope of my invention, which is not to be limited to the details disclosed herein but is to be accorded the full scope of the claims so as to embrace any and all equivalent structures and devices.

What is claimed is:

1. A polarographic sensor for determining the partial pressure of a gas in a sample medium including a pair of spaced electrodes adapted to be joined by an electrolyte, one of said electrodes being a sensing electrode, inner and outer membrances for separating said electrodes and electrolyte from the sample medium, said outer membrane being permeable to said gas and impermeable to electrolyte, and means clamping said membranes under tension over said sensing electrode, wherein the improvement comprises:

an opening in said inner membrane aligned with said sensing electrode; and
   said inner membrane being hydrophilic and substantially less permeable to said gas than said outer membrane.

2. A sensor as set forth in claim 1 wherein said inner membrane is substantially water impermeable but has a hydrophilic surface.

3. A sensor as set forth in claim 2 wherein said outer membrane has gas and electrolyte permeability characteristics approximating that of polytetrafluoroethylene and said inner membrane is relatively incompressible.

4. A sensor as set forth in claim 1 wherein said outer membrane has gas and electrolyte permeability characteristics approximating that of polytetrafluoroethylene.

5. A sensor as set forth in claim 1 wherein said inner membrane has gas and electrolyte permeability characteristics approximating that of polyethylene terephthalate.

6. A sensor as set forth in claim 1 wherein said inner membrane is relatively incompressible.

7. A sensor as set forth in claim 1 wherein said inner membrane is formed of polyethylene terephthalate.

8. A sensor as set forth in claim 7 wherein said outer membrane is selected from the group consisting of polyethylene, polypropylene, a polymer of a fluorinated alkane, and silicone rubber.

9. A sensor as set forth in claim 1 wherein said opening in said inner membrane is smaller than the exposed area of said sensing electrode so that said inner membrane masks a portion of said sensing electrode.

10. A polarographic sensor for determining the partial pressure of a gas in a sample medium including a pair of spaced electrodes adapted to be joined by an electrolyte, one of said electrodes being a sensing electrode, inner and outer membranes for separating said electrodes and electrolyte from the sample medium, said outer membrane being permeable to said gas and impermeable to electrolyte, and means clamping said membranes under tension over said sensing electrode, wherein the improvement comprises:

an opening in said inner membrane aligned with said sensing electrode; and said inner membrane being substantially water impermeable but having a hydrophilic surface.

11. A sensor as set forth in claim 10 wherein said outer membrane has gas and electrolyte permeability characteristics approximating that of polytetrafluoroethylene.

12. A sensor as set forth in claim 11 wherein said inner membrane is relatively incompressible.

13. A sensor as set forth in claim 10 wherein said inner membrane is relatively incompressible.

References Cited

UNITED STATES PATENTS

| | | | |
|---|---|---|---|
| 3,260,656 | 7/1966 | Ross | 204—195 |
| 3,278,408 | 10/1966 | Leonard et al. | 204—195 |
| 3,334,039 | 8/1967 | Vlasak | 204—195 |
| 3,410,778 | 11/1968 | Krasberg | 204—195 |
| 3,505,196 | 4/1970 | Dahms | 204—195 |

TA-HSUNG TUNG, Primary Examiner